Sept. 23, 1952          R. H. BROWN          2,611,247
ROTARY TURBINE-TYPE HYDRAULIC COUPLING
Filed Jan. 9, 1950          3 Sheets-Sheet 1
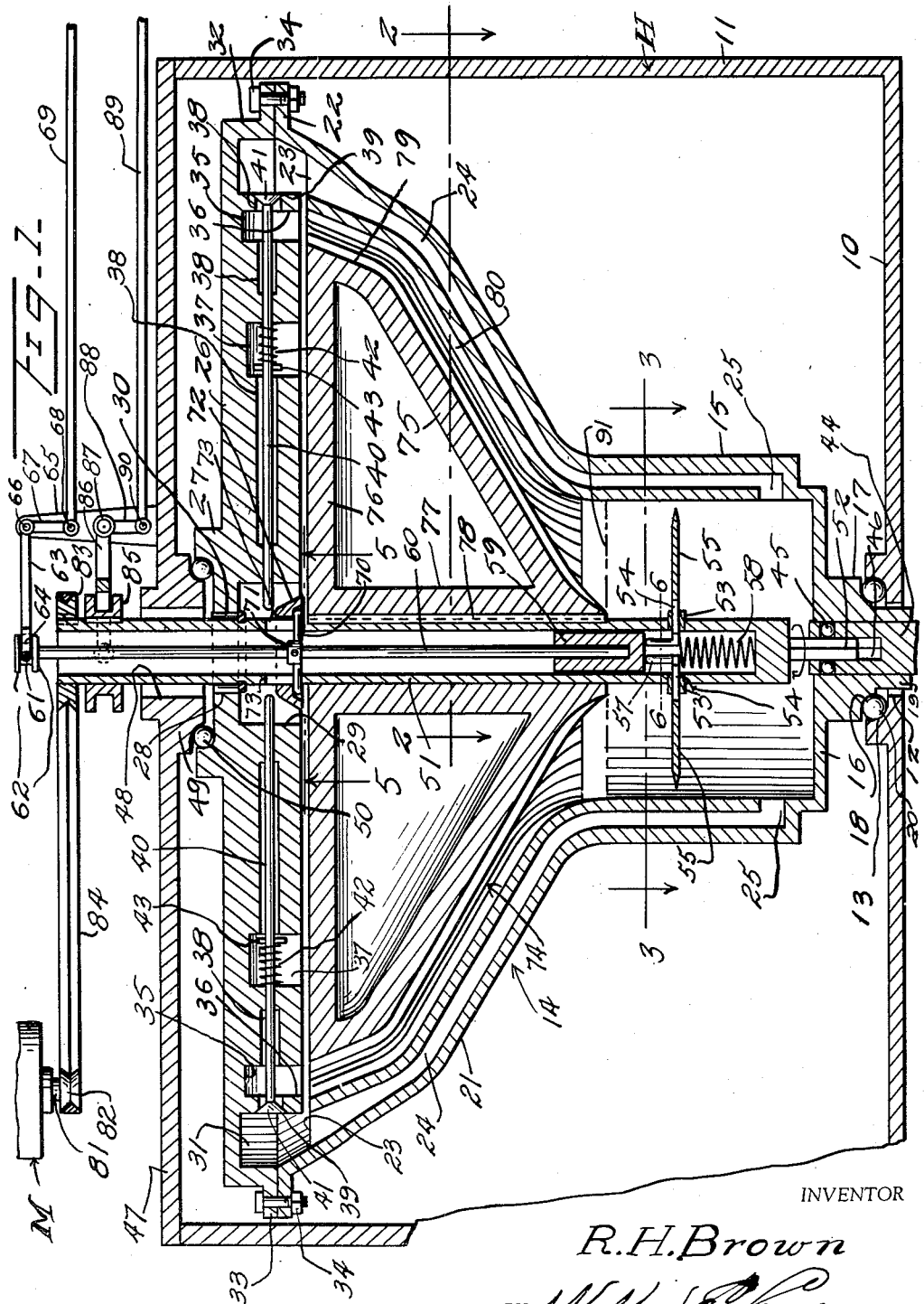
INVENTOR
R.H.Brown
BY Wilfred E. Lawson
ATTORNEY Sept. 23, 1952 R. H. BROWN 2,611,247
ROTARY TURBINE-TYPE HYDRAULIC COUPLING
Filed Jan. 9, 1950 3 Sheets-Sheet 2
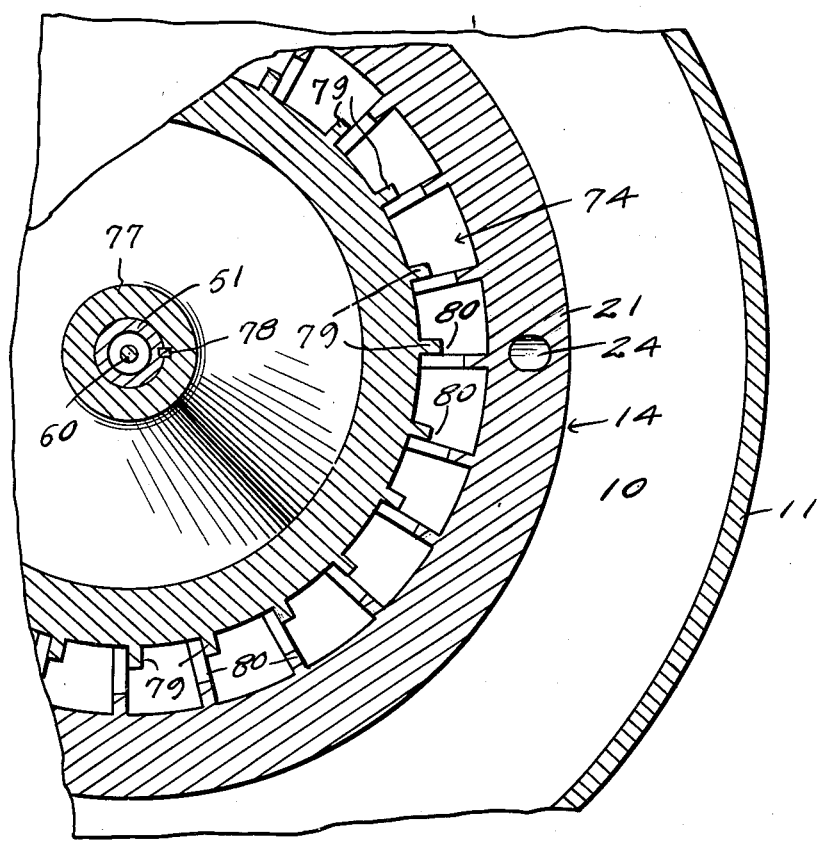
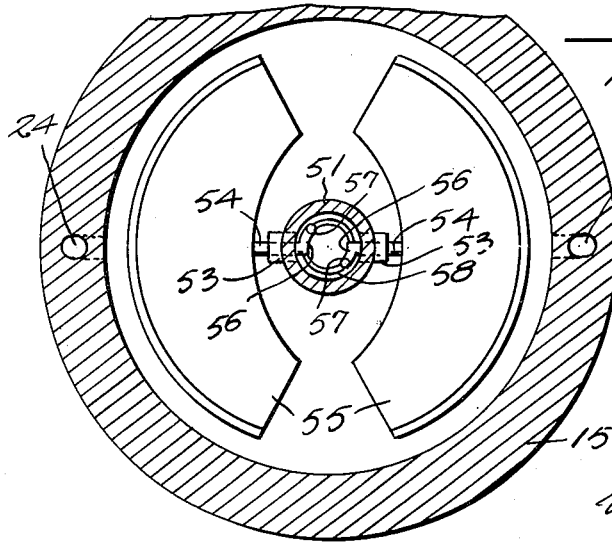
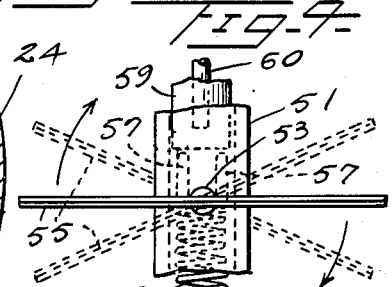
INVENTOR.
R. H. Brown
BY
Wilfred E Lawson
Atty.

Sept. 23, 1952 R. H. BROWN 2,611,247
ROTARY TURBINE-TYPE HYDRAULIC COUPLING
Filed Jan. 9, 1950 3 Sheets-Sheet 3
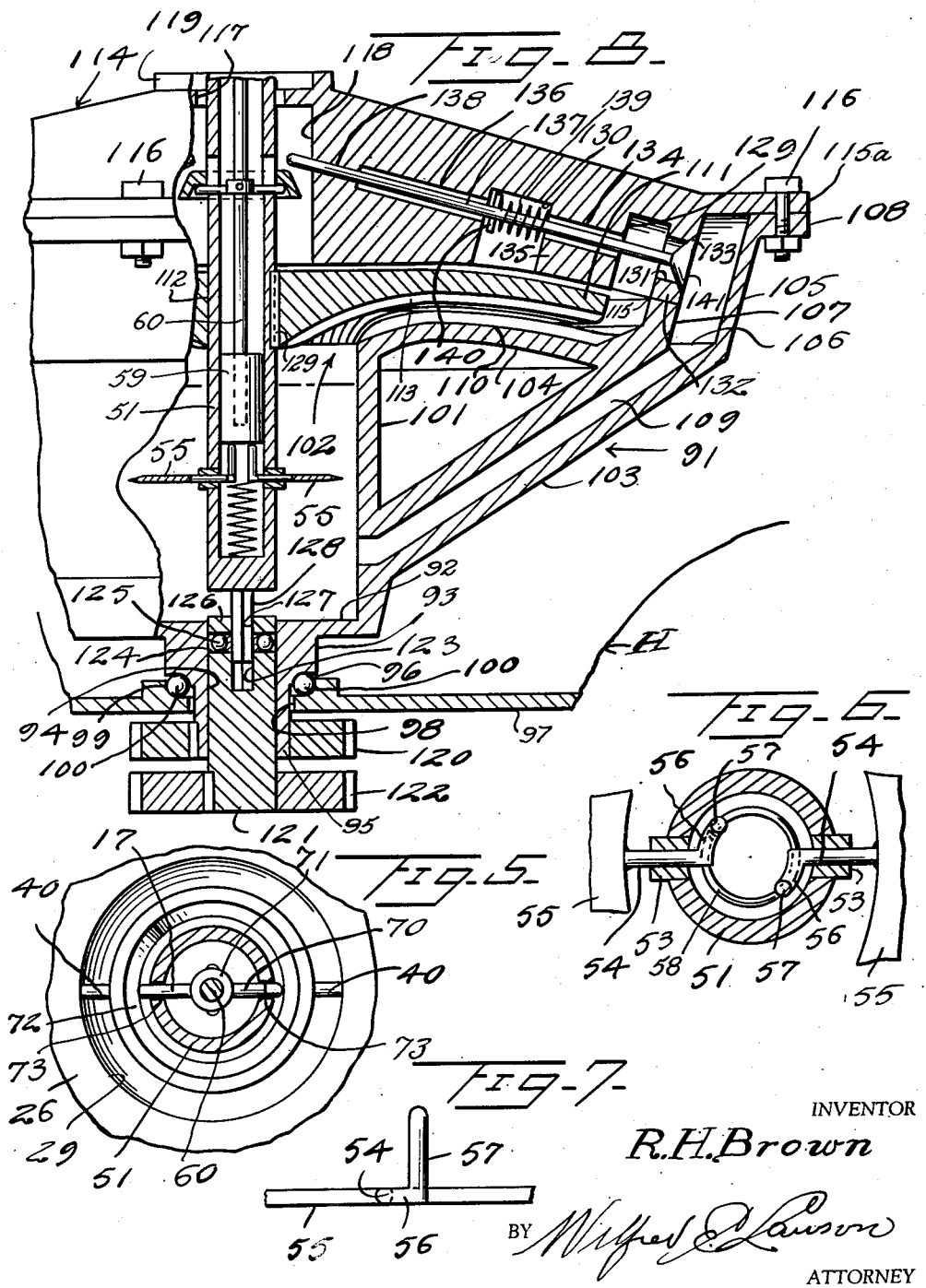
INVENTOR
R.H.Brown
BY Wilfred E. Lawson
ATTORNEY Patented Sept. 23, 1952

2,611,247

UNITED STATES PATENT OFFICE 2,611,247

ROTARY TURBINE-TYPE HYDRAULIC COUPLING

Robert H. Brown, Pulaski, Tenn.

Application January 9, 1950, Serial No. 137,629

3 Claims. (Cl. 60—54)

1

This invention relates to rotary turbine-type hydraulic couplings comprising a driving member and a driven member and the primary object of the invention is to provide a hydraulic coupling of the character indicated above, the driven member of which is adapted to be connected with the driving member without the use of any outside gears, clutches or the like while the driving member is running and regardless of the speed at which it is running.

Another object of the invention is to provide a hydraulic coupling of the character indicated above in which the driven member of which is adapted to stop without stopping the driving member or reducing the running speed of said member.

A further object of the invention is to provide a hydraulic coupling of the character indicated above in which the ratio of speed transmission between the driving and the driven member is regulated by adjusting the clearance distance between the two members.

An additional object of the invention is to provide a hydraulic coupling of the character indicated above in which the driving and the driven members can be arranged in direct engagement with each other.

The invention consists in the details of construction and in the combination and arrangement of the several parts of an improved hydraulic coupling whereby certain advantages are attained, as will be hereinafter more fully set forth.

In order that the invention may be better understood, I will now proceed to describe the same with reference to the accompanying drawings, wherein:

Figure 1 is a view in section taken on a vertical center plane of a hydraulic coupling in accordance with the invention;

Figure 2 is a fragmentary view in section taken on the line 2—2 in Figure 1;

Figure 3 is a fragmentary view in section taken on the line 3—3 in Figure 1;

Figure 4 is a detail view in elevation of the adjusting means of a pair of adjustable liquid impelling fins used in connection with the hydraulic coupling in accordance with the invention;

Figure 5 is a view in section taken on the line 5—5 in Figure 1;

Figure 6 is a view in section taken on the line 6—6 in Figure 1;

Figure 7 is a side view in elevation of one of the adjustable liquid impelling fins; and Figure 8 is a side view partly in elevation and partly in section of a modified form of a hydraulic coupling in accordance with the invention.

The hydraulic coupling as herein embodied is surrounded by a preferably cylindrical housing H having a bottom 10 and a peripheral wall 11. In the bottom 10 a central opening 12 is provided which is surrounded by an annular ball race 13 formed or fastened on the inside surface of the bottom 10.

The hydraulic coupling as herein embodied comprises a driven member 14 having a lower cylindrical portion 15. Centrally of the outside surface of the bottom 16 of the lower portion 15 of the driven member a hollow boss 17 is disposed on the peripheral surface of which a second ball race 18 corresponding to the first ball race 13 is formed. The portion 19 of the hollow boss 17, which extends beyond the ball race 18, has a reduced outside diameter and extends through the opening 12 in the housing bottom 10. A plurality of balls 20 are disposed in the cooperating ball races 13 and 18 so that the driven member 14 rests thereon.

The upper peripheral wall 21 of the upper portion of the driven member 14 extends upwardly and outwardly from the lower portion of said member and an annular flange 22 is formed on the upper lip of the peripheral wall 21.

Attention is called to the fact that the inner surface of the peripheral wall of the lower portion 15 of the driven member 14 is smoothly finished.

The top surface of peripheral wall 21 is finished so that a shoulder 23 is formed located at a lower level than the top surface of the member 14. From this shoulder a plurality of drain passages 24 extend downwardly through the peripheral wall portions 21 and 15. These passages 24 taper slightly in downward direction and communicate at their lower ends with the interior of the cylindrical portion 15 of the driven member 14 by means of openings 25 disposed adjacent to the bottom 16 of the driven member 14.

Centrally of the upper surface of a cover 26 an upwardly extending ball race 27 is provided and centrally of said ball race a hole 28 is arranged in the cover 26 having a counterbore 29 extending upwardly from the lower surface of the cover 26. In the hole 28 a bearing 30 is located.

An annular channel 31 is formed in the underside of the cover 26 and the outer wall 32 of said channel does not extend over the entire thickness of the cover 26. An annular flange 33 is formed on the outer wall 32 of the channel 31 and is adapted to rest on the flange 22 to which it is secured by a plurality of bolts 34 or the like. The channel 31 is disposed so that the upper ends of the passages 24 coincide with said channel, when the cover 26 is attached to the driven member 14.

Adjacent to the inside wall of the annular channel 31 a second annular channel 35 is cut into the underside of the cover 26 so that an annular wall 36 is formed which coincides with the inside surface of the upper end portion of the peripheral wall 21 of the driven member 14.

A third annular channel 37 is cut into the under side of the cover 26 intermediate the counterbore 29 and the second annular channel 35 and is arranged concentrically with the other annular channels 31 and 35.

A plurality of radial bores 38 connect the three annular channels with each other and the outer end portion of each bore 38 is countersunk, as at 39. A valve stem 40 extends through each radial bore 38 and has on its outer end a valve head 41 fitting snugly into the countersink 39. A spiral spring 42 surrounds the portion of each valve stem 40 located in the third annular channel 37. The outer end of each spring 42 abuts the outer wall of the channel 37 while the inner end of each spring 42 engages a stop pin 43 extending diametrically through each valve rod 40 inside the channel 37 urging the valve head 41 onto the valve seat 39. The inner end portion of each valve rod 40 extends into the counterbore 29 and is rounded off.

The inside surface of the hollow boss 17 is finished and the end portion 44 of a drive shaft 51 extends rotatably through said boss. A ball bearing 45 is formed on said drive shaft portion and an axial hole 46 of preferably square cross section extends centrally partway into said axial hole 46.

The upper end of the housing H is closed by means of a top plate 47 resting on the peripheral wall 11 of said housing. An opening 48 is provided centrally in said top plate 47 and coaxially with said opening a ball race 49 is formed on or secured to the underside of the top plate 47 and is adapted to cooperate with the ball race 27. A plurality of balls 50 are arranged between the two ball races.

A hollow drive shaft 51 is closed at one of its ends and a rod 52 fitting slidably into the axial hole 46 in the drive shaft end portion 44 extends axially and centrally through the closed end of the hollow drive shaft 51. Said hollow shaft extends rotatably through the bearing 30 and is supported thereby. It extends also through the hole 48 beyond the top plate 47.

A plurality of bearings 53 are inserted radially into the wall of the hollow shaft 51 at an equal distance from the closed end of the shaft so that the bearings 53 are disposed inside the cylindrical lower portion 15 of the driven member 14 when the driving shaft 51 is arranged in working position.

In each bearing 53 a shaft 54 is disposed rotatably and on the outer end portion of each shaft 54 a plate like fin 55 having an arcuate outer edge is secured so that the shaft 54 extends radially from the center of the inner edge of each fin 55.

On the inner end portion of each shaft 54 a curved lever arm 56 (see Figure 6) is formed extending laterally of the shaft 54 so that all lever arms 56 are located inside the hollow shaft 51 and extend therein in the same direction. On the end of each lever arm 56 an upwardly extending finger 57 is formed. A helical spring 58 is disposed inside the hollow shaft 51 and abuts with one of its ends the closure wall of said shaft and bears at its other end against the lever arms 56 so that the pressure of the spring 58 holds the lever arms 56 and the fins 55 in a position parallel to the bottom 16 of the driven member 14. A hollow plunger 59 is disposed slidably inside the hollow shaft 51 and rests loosely on the fingers 57. A plunger rod 60 is inserted and secured in the plunger 59. The plunger rod 60 extends upwardly through and beyond the hollow shaft 51. A pulley 61 provided on each of its ends with a flange 62 is firmly mounted on the plunger rod 60 outside of the hollow shaft 51. A lever 63 having a bifurcated free end portion 64 engages the pulley 61 between the flanges 62 with said bifurcated end portion 64.

An upright bracket 65 is mounted on top of the top plate 47 and a stub shaft 66 is rotatably supported by said bracket. The end portion of the lever arm 63 remote from the bifurcated end portion 64 thereof is rigidly secured to the stub shaft 66 and another lever 67 is also rigidly secured with one of its end portions to the stub shaft 66. A pivot pin 68 extends through the other end portion of said lever 67 and an adjusting rod 69 is pivotally connected at one of its ends with the pivot pin 68.

A plurality of pins 70 are secured to and extend radially from a ring member 71 securely mounted on the plunger rod 60 approximately at a level even with the lower surface of the cover 26 when the plunger 59 rests loosely on the fingers 57.

A conical sleeve 72 is loosely mounted on the hollow shaft 51 and rests loosely on the pins 70 which extend through axial openings 73 provided in the wall of the hollow shaft 51.

The driving member 74 has a peripheral wall 75 of a substantially inverted conical shape, a flat top 76 and centrally located cylindrical inner wall 77 connecting the peripheral wall 75 with the flat top 76 and open at both ends. The inside diameter of the inner wall 77 is such that it fits snugly onto the hollow shaft 51 to which it is secured by means of a key 78 or in any other suitable manner so that the driving member 74 is disposed inside the driven member 14 and underneath the cover 26.

On the outside surface of the driving member 74 a plurality of radially extending vanes or ribs 79 are provided and on the inside surface of the peripheral wall portion 21 of the driven member 14 a plurality of radially extending vanes or ribs 80 are provided.

The hollow shaft 51 and the driving member 74 mounted thereon are adapted to be rotated by means of a source of power, for instance, a motor M on the shaft 81 of which a pulley 82 is rigidly mounted. Adjacent to the upper end of the hollow shaft 51 a pulley 83 is mounted and a belt 84 is trained over the pulleys 82 and 83.

An annular collar 85 having a U-shaped cross section is firmly mounted on the hollow shaft 51 below the pulley 83. A bifurcated lever arm 86 engages said collar 85 with its bifurcation and is rigidly mounted with its other end portion on a stub shaft 87 rotatably supported by the bracket 65. Another lever arm 88 is rigidly secured with one of its end portions to the stub shaft 87 so that it extends downwardly at an approximately right angle to the lever 86 and an adjusting rod 89 is pivotally connected with the other end portion of the lever 88 by means of a pivot pin 90.

When the above described hydraulic coupling is to be used, the lower portion of the driven member 14 having the smooth straight upright peripheral wall 75 is filled with liquid, for instance oil up to the level indicated by line 91 in Figure 1. The fins 55 are arranged parallel to the bottom 16 so that they will slide through the oil when the motor M is energized and the hollow shaft 51, on which the fins 55 are mounted, is rotated in the bearing 30. The drive shaft end portion 44 is rotated also through the rod 52 on the lower end of the hollow shaft 51. The driving member 74 is also rotated since it is firmly mounted on the hollow shaft 51 and in order to transfer this rotary motion to the driven member 14 the oil in said driven member 14 is to be forced into the space between the vanes 79 on the driving member 74 and the vanes 80 on the driven member. To drive the oil into this space the adjusting rod 69 is manipulated to swing the bifurcated end portion 64 of the lever arm 63 downwardly whereby the plunger rod 60 and the plunger 59 are forced downwardly pushing the fingers 57 downward so that the fins 55 are arranged in inclined positions, as indicated in broken lines in Figure 4. The so arranged fins drive the oil upwardly into the space between the vanes 79 and 80 and the rotary motion of the former is imparted to the oil, which is forced higher up by the centrifugal force created by the rotary motion of the driving member 74. The oil in turn creates torque in the driven member 14 so that this member is rotated in the ball bearings 20 and 50. The ratio of slippage between the driving member 74 and the driven member 14 determines the speed ratio of the driven member 14 to driving member 74 and the slippage ratio is adjusted by adjusting the amount of clearance between the vanes 79 and the vanes 80. This is accomplished by manipulating the adjusting rod 89 to swing the bifurcated end portion of the lever 86 upwardly to increase the clearance between the vanes when the speed of the driven member 14 is to be reduced, or to swing said bifurcated lever end portion downwardly to decrease the clearance between the vanes when the speed of the driven member is to be increased.

When the driven member 14 is to be stopped without stopping the driving member 74 or decreasing the speed of said member the adjusting rod 69 is manipulated to swing the bifurcated end portion 64 of the lever 63 upwardly, whereby the plunger rod 60 is pulled upwardly. The fingers 57 are disengaged from the downward pressure of the plunger 59 and the fins 55 are arranged in positions parallel to the bottom 16 by the pressure of the spring 58.

At the same time the pins 70 lift the conical sleeve 72 so that said sleeve engages the inner ends of the valve rods 40 forcing them outwardly against the pressure of the springs 42 and lifting the valve heads 41 from their seats 39.

The oil driven upwardly between the vanes 79 and 80 enters the annular channel 35 under centrifugal power and when the valves 41 are opened this oil flows into the annular channel 31 which is large enough to receive all oil contained in the coupling, so that the flow of the oil through the valves 41 under centrifugal force would not be impeded. From the channel 35 the oil returns through the passages 24 to the lower portion 15 of the driven member 14, so that the transmission of rotary motion from the driving member 74 to the driven member 14 is interrupted without reducing the speed of the former or stopping it.

In Figure 8 there is shown a slightly modified form of a hydraulic coupling in accordance with the invention and the torque converter as embodied in Figure 8 comprises a driven member 91 having a bottom 92 on the underside of which a centrally located boss 93 is arranged. The boss 93 has an axial bore 94 and the lower end portion 95 of the boss has a smaller outside diameter. On the junction of the upper and lower portion of the boss an upper ball race 96 is formed on the boss.

The hydraulic coupling is located in a housing similar to the housing H described above and centrally of the bottom 97 of this housing an opening 98 is provided permitting the reduced boss portion 95 to extend therethrough. A lower ball race 99 surrounds the opening 98 and a plurality of balls 100 are disposed in the two cooperating ball races 96 and 99 so that the driven member 91 rests thereon.

From the bottom 92 a cylindrical inner wall 101 extends upwardly forming a container 102 for a liquid such as oil or the like. An outside wall 103 extends upwardly and outwardly from the lower portion of the inner wall 101 and a top wall 104 extends from the top end portion of the inner wall 101 to the outside wall 103 in a shallow upwardly convex curve. Above the top wall 104 the outer wall extends slightly more steeply upwardly, as at 105 and in the upper surface of this wall portion an annular channel 106 is formed, the wall 107 of which is lower than the outer one which has at its upper end portion a flange 108. A plurality of passages 109 are provided in the outer wall 103 connecting the annular channel 106 with the interior of the container 102.

A driving member 111 has a central opening 112. The lower surface of said member 111 extends curvedly over the top wall 104 of the driven member 91 but stops short of the inner portion 107 of the outer wall portion 105 and has a plurality of vanes 113 or ribs formed thereon which extend radially over said surface.

The lower surface of a cover 114 is shaped to rest on the upper marginal surface 115 of the lower inside wall 107 of the channel 106 and to extend over the top surface of the driving member 111. The peripheral surface of the cover 114 forms a prolongation of the inner wall 107 of the annular channel 106. On the upper marginal portion of the peripheral surface of the cover 114 an outwardly extending flange 115a is formed extending over and covering the annular channel 106 and resting on the flange 108 to which it is secured by a plurality of bolts 116 or the like.

The cover has a shallow conical shape and is provided with a central hole 117 having on its lower end a deep counterbore 118. On the top surface of the cover 114 a lower ball race 119 is formed coaxially with the hole 117 and adapted to cooperate with a top ball race formed on a top plate (not shown) covering the housing.

A transmission means, such as a gear 120, is mounted on the reduced boss portion 95 and a short shaft 121 is rotatably arranged in the bore 94 extending through the entire boss 93 and on the lower end portion of said shaft which extends beyond the boss a transmission means such as a gear 122 is mounted.

The upper end of the short shaft 121 is located below the bottom 92 of the driven member 91. A bore 123 of polygonal cross section is provided centrally of the shaft 121 and extends downwardly into said shaft. The upper end surface of said shaft forms a ball race 124 surrounding the bore 123 and a plurality of balls 125 rest on the ball race 124. A disk 126 having an outside diameter equal to the diameter of the short shaft 121 is provided with a hole 127 of the same shape and size as the hole 123.

A hollow driving shaft 51, equipped with the plunger device 59 and 60, the adjustable fins 55 and rod 128 extending downwardly from the shaft 51 and fitting slidably through the hole 121 and into the bore 123, extends through the hole 117 in the cover 114 and the hole 112 in the driving member 111 and the latter is secured to the hollow shaft 51 by means of a key 129 or the like.

An annular channel 129 is cut into the lower surface of the cover 114 inwardly from and coaxially with the annular channel 106, and another annular channel 130 is cut into the lower surface of the cover 114 inwardly from the channel 129 and coaxial therewith.

A plurality of holes 131 in the partition 132 between the annular channels 106 and 129, connect these two channels with each other and each hole 131 is countersunk on its outer end portion to form a valve seat 133. A passage 134 extends coaxially with each hole 131 through the partition 135 between the annular channels 129 and 130 and a bore 136 of the same diameter as each passage 134 extends coaxially with each of said passages 134 into the cover portion inwardly of the annular channel 130.

A valve stem 137 extends through each set of coaxial passages 134 and bores 136 and is slidably arranged in a guide bore 138 extending coaxially from the inner end of each bore 136 to the counterbore 118. The inner end of each valve stem 137 is rounded and the inner end portion of each of said stems extends into said counterbore. A helical spring 139 surrounds each valve stem inside the annular channel 130 and abuts the partition 135 with its outer end portion. The inner end portion of each spring 139 abuts a stop pin 140 extending diametrically through each valve stem 137 inside the channel 130 so that a valve head 141 attached to each valve stem 137 is forced by the pressure of the spring 139 onto the seat 133.

When the driving member 111 is set in motion by starting the motor M (not shown in Figure 8) which drives the hollow shaft 51 to which said driving member is secured the fins 55 slide through the oil in the container 102 without disturbing it until the fins are pivoted into slanting positions as described above. Then the oil is forced into the space between the driving member 111 and the driven member 91 where the vanes 113 on the driving member 111 will force the oil into rotary flowing motion, which in turn will be translated to the driven member.

The stopping of the driven member 91 is attained in the same manner as described for the original embodiment by lifting the hollow shaft to open the valves 141.

When the driving member is rotated while the fins 55 are in the position shown in Figure 8, the short shaft 121 and the gear 122 thereon are set in motion and when the shaft is lifted so far that the rod 128 slides out of engagement with said short shaft, the latter is not driven anymore.

From the foregoing description it is thought to be obvious that an improved hydraulic coupling constructed in accordance with my invention is particularly well adapted for use by reason of the convenience and facility with which it may be assembled and operated.

I claim:

1. In a hydraulic coupling, a hollow driven member open at its top end, a driving member within said driven member, said members being rotatable about a common axis, a wall of the driven member extending substantially parallel to a wall of the driving member, a plurality of vanes on each of said walls, the vanes on one of said walls being disposed opposite to the vanes on the other wall, the driven member having its lower end formed to provide a concentrically disposed fluid reservoir, a removable cover on the open top of said driven member, a hollow shaft extending rotatably through the cover and the driven member, the driving member being secured to the hollow shaft, adjustable means attached to the hollow shaft and extending into the reservoir for urging the fluid into the space between the driving and the driven member, means for urging the fluid actuating means into position to allow them to slide through the oil without disturbing it, and means for forcing the fluid actuating means into working position.

2. A hydraulic coupling as set forth in claim 1, wherein the fluid actuating means consist of a plurality of fins, a centrally disposed radially extending shaft on each fin, a radially disposed bearing for each fin shaft located radially in the wall of the hollow shaft, a laterally extending curved lever arm on the inner end of each fin shaft, said lever arms all extending in the same direction, an uprightly extending finger on the end of each curved lever arm, a plunger slidably mounted in the hollow shaft, means for selectively adjusting said plunger at lower or higher level in the hollow shaft and a spring disposed in said shaft, engaging the lever arms and urging them to rotate the fin shafts.

3. The hydraulic coupling as defined in claim 1, with means for rotating said hollow shaft, a plurality of bearings disposed radially in the wall of said shaft, a shaft rotatably journalled in each bearing and carrying a fin on its outer end, a curved lever arm on the inner end of each shaft, a spring disposed in the hollow shaft and urging said lever arms to swing upwardly, an upwardly pointing finger on the end of each lever arm, a plunger resting loosely on the fingers, a plunger rod extending upwardly through the hollow shaft, a train of levers engaging the plunger rod and adapted to move it upwardly and downwardly, a plurality of annular channels arranged in the underside of the cover concentrically with the hollow shaft, a counterbore in the underside of the cover coaxial with the hollow shaft, a hole connecting the outermost annular channel with the next channel, the hole forming a valve seat, a spring biased valve stem slidably extending coaxially with the hole connecting the two outer channels through the partitions dividing the channels from each other and extending into the counterbore, a conical sleeve mounted on the hollow shaft, means for moving said shaft axially to adjust the distance between driving and the driven member and to engage the valve stem with the sleeve, and a valve head on the outer end of the stem firmly seated by the spring pressure and unseated by the conical sleeve, thereby allowing the fluid collected in the second outer channel from the space between the driving and the driven member to flow into the outer channel from where it can return to the reservoir through a passage provided in the outer wall of the driven member.

ROBERT H. BROWN.

REFERENCES CITED

The following references are of record in the file of this patent:

UNITED STATES PATENTS

| Number | Name | Date |
|---|---|---|
| 2,466,431 | Jendresen | Apr. 5, 1949 |